UNITED STATES PATENT OFFICE.

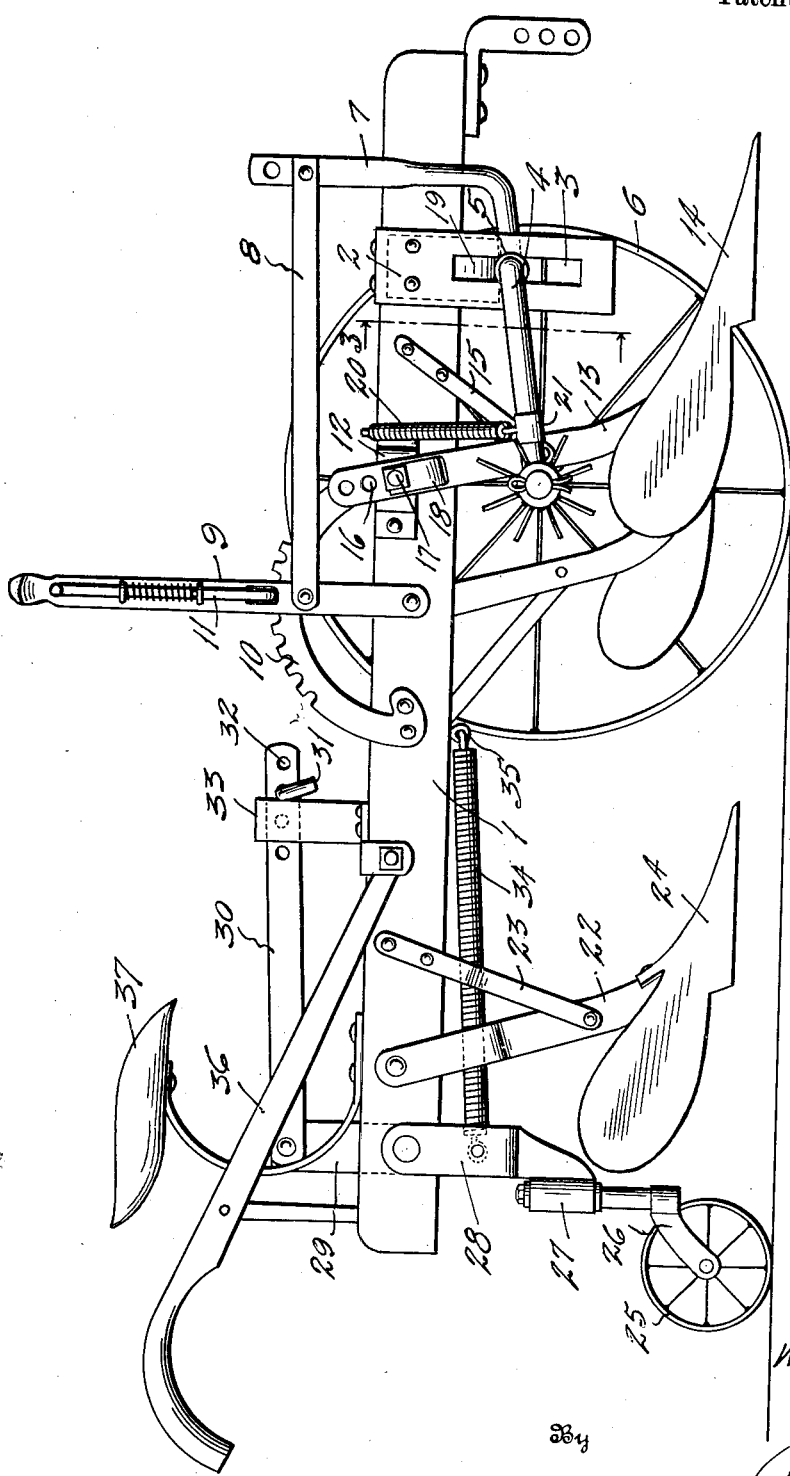

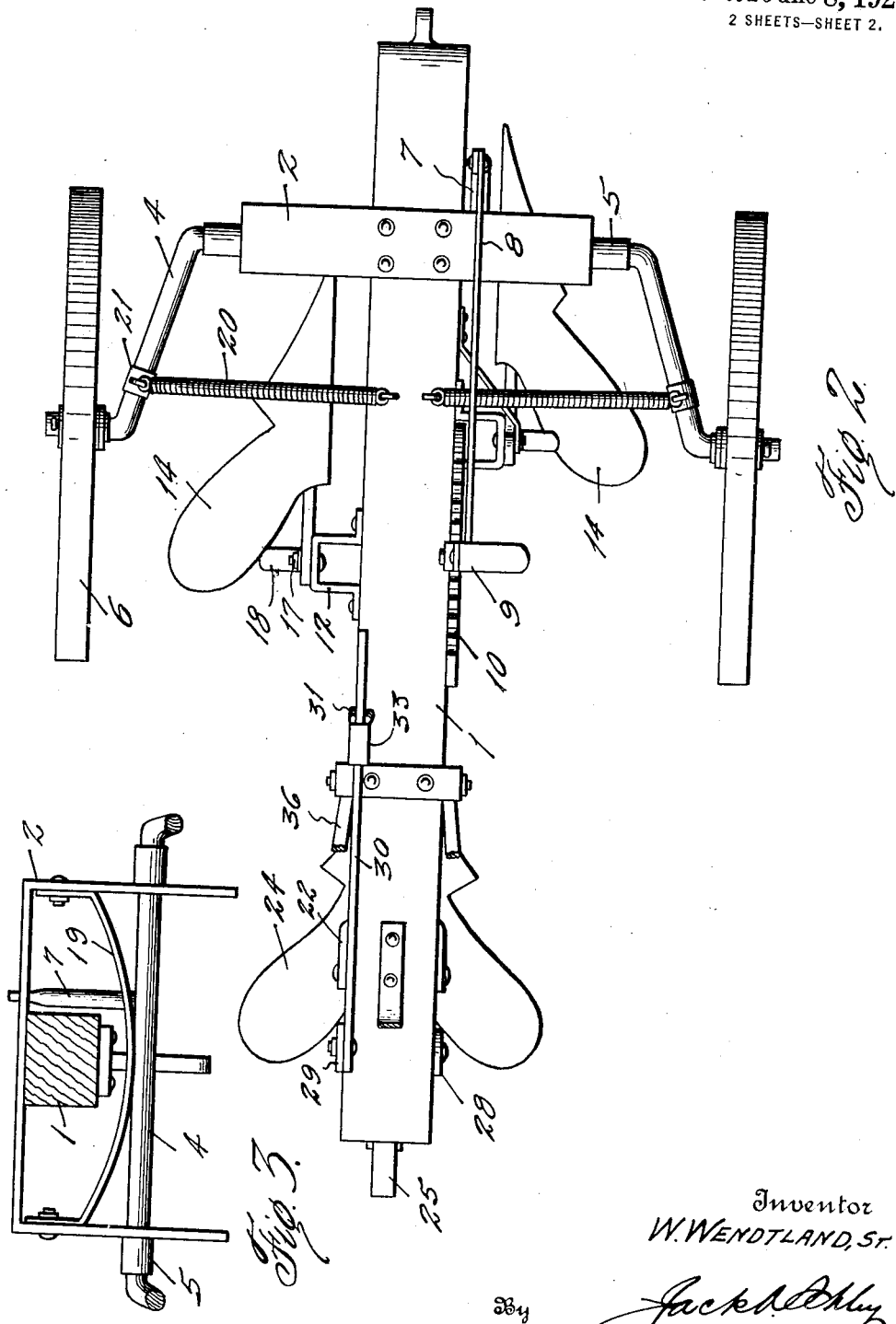

WILLIAM WENDTLAND, SR., OF SHINER, TEXAS.

PLOW.

1,342,836.  Specification of Letters Patent.  Patented June 8, 1920.

Application filed May 19, 1919. Serial No. 298,045.

*To all whom it may concern:*

Be it known that I, WILLIAM WENDTLAND, Sr., a citizen of the United States, residing at Shiner, in the county of Lavaca and State of Texas, have invented certain new and useful Improvements in Plows, of which the following is a specification.

This invention relates to new and useful improvements in plows.

The purpose of the invention is to provide a plow that will at a single operation break and bed the soil, whereas it is customary to go over the soil at least twice with the ordinary plow. Another result sought is to conserve time and labor and more thoroughly cultivate the soil.

In carrying out the invention right and left bottoms or turning shovels are mounted in advance of a middlebreaker whereby a wide strip is broken and a half bed is thrown up on the right and another half bed is thrown up on the left, thus completing a full bed at one operation. The front turning shovels are adjustably supported whereby the depth may be regulated and provision is made for a rocking wheel support so that a displacement of one wheel will not throw the shovel on its side out of the ground. The middlebreaker is also adjustably supported so as to be depressed or raised according to the desired depth. A particular feature is, that all the soil is turned and no raw or uncultivated land is left.

The invention will be more readily understood from a reading of the following specification and by reference to the accompanying drawings, in which an example of the invention is shown and wherein:

Figure 1 is a side elevation of a plow constructed in accordance with my invention, Fig. 2 is a plan view of the same, and Fig. 3 is a vertical sectional view on the line 3—3 of Fig. 1.

In the drawings the numeral 1 designates a longitudinal central beam which may be of any suitable material. An arched bracket 2 is fastened on the front end of the beam and has vertical slots 3 in its sides. An arched axle 4 engages in the slots and has collars 5 at each side engaging the outer faces of the bracket so as to hold the axle against lateral displacement, but the axle to slide vertically in the slots. The axle has its outer ends supported in the ground wheels 6.

Adjacent the beam an angular upstanding arm 7 is made rigid to the axle and projects above the beam. A link 8 is adjustably connected with the arm and has its rear end connected to a lever 9 which has its lower end pivoted to the side of the beam concentrically of a locking segment 10. A locking plunger 11 is carried by the lever and engages the segment to lock the lever in adjusted positions. By swinging the lever the arm 7 is swung, whereby the axle 4 is rocked. The axle is disposed with its sides directed rearwardly and then when rocked is swung up or down thereby elevating or lowering the front end of the beam.

Brackets 12 are fastened on each side of the beam, the right hand bracket being in advance. A shank 13 is mounted on each bracket and carries a turning shovel 14 on its lower end. From each shank a brace 15 extends up to the beam. Each shank has a plurality of apertures 16 at its upper end. A bolt 17 is passed through one of the apertures of each shank and its bracket and the said shank fastened at the desired elevation. Foot rests 18 are also carried by the bolts.

The shovels are arranged to throw the soil outward each thus forming a half bed. When the plow is being transported the lever 9 may be pulled back, thus elevating the shovels, and by moving the lever forward the shovels are lowered. A rocker 19 is fastened within the bracket 2 and bears on the axle 4. By reason of the slots 3 and the rocker the axle may rock so that an upward displacement of one of the wheels will not lift the shovels out of the ground. Coiled springs 20 extend from the beam on each side and have their lower ends attached to collars 21 fixed on the axle adjacent the hubs of the wheels. These springs act to hold the axle in its normal position and assist in returning it when it is displaced.

Near the rear end of the beam a standard 22 is mounted, its upper end being forked to straddle the beam and its foot lying under the center of the beam. Braces 23 extend from the standard up to the beam. A middlebreaker bottom 24 is mounted on the foot of the standard. The shovels 14 and the bottom 24 have ample moldboards so as to efficiently turn and displace the soil. By observing Fig. 2 it will be seen that the gap or strip left between the turning shovels 14 is fully broken and the soil thrown onto the right and left beds by the middlebreaker which overlaps the furrows of the shovels. The shovels being set one in advance of the other reduces the liability of trash and stalks catching thereon as is obvious.

The rear end of the beam is supported on a caster wheel 25 mounted in a yoke 26 journaled in a hanger 27 having a fork 28 receiving the beam and pivoted thereon. An arm 29 projects above the beam and is pivoted to the rear end of a link 30 which passes through a keeper 33. The forward end of the link has a plurality of holes 32. A stop-yoke 31 is passed through one of the holes and limits the rearward movement of the link by engaging the front side of the keeper. A heavy coiled spring 34 is attached to the fork 28 and passed through the fork of the standard to an eye 35. The function of this spring is to permit the fork and hanger to be swung rearward to lower the beam and standard and to return the parts when pressure is relieved. It will be seen that when it is desired to sink the bottom 24 lower the rear end of the beam may be forced down by pushing down on a pair of handles 36. A seat 37 may be placed on the beam if desired so that the operator may ride, but in such a case the spring 34 must have sufficient tension to carry the added weight of the operator. It is obvious that the rear end adjustment could be made in other ways. By means of the caster wheel the implement may be made to turn within its own length and is easily guided.

In using the plow it is drawn along the field by a team or tractor.

The lever 9 is swung to lower the turning shovels 14 to the proper depth. As the plow moves over the ground the turning shovels break the soil and turn it to the right and left, throwing up a half a bed on each side, but leaving an unbroken strip in the center. The middlebreaker cuts this center strip and beds the soil in the furrows left by the shovels. The tension of the spring 34 may be such that the weight of the driver will depress the middlebreaker to the proper depth, of if the driver is walking he may depress it by means of the handles.

What I claim, is:

1. In a plow of the character described, a beam, an arch axle supporting the front end of the beam, means for swinging the axle to raise and lower the beam, ground wheels supporting the axle, right and left turning shovels on opposite sides of the beam, a rocker device transversely of the beam and resting on the axle, and equalizing springs extending from the beam to the axle.

2. In a plow of the character described, a beam, turning shovels carried by the beam, an arch axle, a transverse bracket having slots receiving the axle, ground wheels supporting the axle, a rocker member disposed within the bracket and resting on the axle for rocking the beam on the axle, equalizing springs extending from the beam to each end of the axle, and means for swinging the axle to raise and lower the beam.

3. In a plow of the character described, a longitudinally extending beam, an axle arranged transversely of the beam, and having an arched portion, means for pivotally connecting the arched portion of the axle with the beam so that the axle is capable of swinging transversely of the beam and its side portions longitudinally of said beam, ground wheels carried by the axle, plow shares arranged beneath and connected with the beam, equalizing means to oppose the swinging movement of the axle transversely of the beam, and separate means to positively swing the axle longitudinally of the beam.

4. In a plow of the character described, a longitudinally extending beam, a member connected with the beam and extending transversely thereof and having a curved surface, an axle arranged transversely of the beam and having an arched portion connected with the beam and contacting with the curved surface, ground wheels connected with the ends of the axle, plow shares connected with the beam, equalizing means to oppose the swinging movement of the axle transversely of the beam, and adjustable means connected with the beam and with the axle to swing it longitudinally of the beam and lock the axle in adjustment at a selected angular position.

5. In a plow of the character described, a longitudinal beam, a bracket extending transversely of the beam and secured thereto and having spaced depending arms provided with longitudinal slots, a member secured within the bracket to extend transversely of the beam and having a curved lower surface, an axle having an arched portion loosely mounted within the longitudinal slots and contacting with the curved surface, ground wheels carried by the axle, equalizing means to oppose the swinging movement of the axle transversely of the beam, separate means to swing the axle longitudinally of the beam, adjustable wheeled means connected with the opposite end of the beam to support the same, and plow shares carried by the beam.

In testimony whereof I affix my signature.

WILLIAM WENDTLAND, Sr.